(12) United States Patent
Chojnacki et al.

(10) Patent No.: US 11,266,141 B1
(45) Date of Patent: Mar. 8, 2022

(54) INSECT-FREE ZONE SYSTEM

(71) Applicant: Thermacell Repellents, inc., Bedford, MA (US)

(72) Inventors: Adam Chojnacki, Bedford, MA (US); Adam Goess, Sturbridge, MA (US)

(73) Assignee: Thermacell Repellents, Inc., Bedford, MA (US)

( * ) Notice: Subject to any disclaimer, the term of this patent is extended or adjusted under 35 U.S.C. 154(b) by 0 days.

(21) Appl. No.: 16/879,116

(22) Filed: May 20, 2020

Related U.S. Application Data

(60) Provisional application No. 62/851,736, filed on May 23, 2019.

(51) Int. Cl.
 *A01M 29/12* (2011.01)
 *A01M 29/10* (2011.01)

(52) U.S. Cl.
 CPC ............ *A01M 29/10* (2013.01); *A01M 29/12* (2013.01); *A01M 2200/012* (2013.01)

(58) Field of Classification Search
 CPC ............... A01M 29/10; A01M 29/12; A01M 2200/012; F21S 15/00; F21V 37/0012; F21V 37/002; F23D 2207/00; F23D 3/02
 USPC .............. 392/385, 386, 390–403, 411
 See application file for complete search history.

(56) References Cited

U.S. PATENT DOCUMENTS

| | | | |
|---|---|---|---|
| 5,700,430 A * | 12/1997 | Bonnema | A01M 1/2088 126/401 |
| 6,517,342 B2 * | 2/2003 | van der Veen | F23Q 7/08 431/72 |
| 6,594,946 B2 * | 7/2003 | Nolen | A01M 1/14 43/114 |
| 10,021,875 B2 * | 7/2018 | Formico | F21K 9/00 |
| 10,842,146 B1 * | 11/2020 | Pannullo | F21V 37/0045 |
| 2005/0169666 A1 * | 8/2005 | Porchia | A61L 9/14 399/111 |
| 2009/0294553 A1 * | 12/2009 | Wang | A01M 1/2088 239/135 |
| 2010/0053942 A1 * | 3/2010 | Tarter | F21L 4/00 362/182 |
| 2015/0144712 A1 * | 5/2015 | Formico | F21V 15/01 239/276 |
| 2019/0281810 A1 * | 9/2019 | Sinur | A01M 29/12 |

* cited by examiner

*Primary Examiner* — Tracie Y Green
(74) *Attorney, Agent, or Firm* — MacMillan, Sobanski & Todd, LLC

(57) ABSTRACT

A pole mounted insect repellent system capable of being staked in the ground reduces and eliminates mosquitoes and insects by creating a perimeter zone of a plurality of insect repellent stake mounted devices such that mosquitos and other insects do not enter the zone.

14 Claims, 5 Drawing Sheets

FIG. 6

INSECT-FREE ZONE SYSTEM

RELATED APPLICATION

This patent application incorporates the contents of provisional patent application Ser. No. 62/851,736, filed May 23, 2019, the contents of which are incorporated herein.

BACKGROUND OF THE INVENTION

This invention relates to a new and improved system for maintaining mosquito or insect free zone outdoors.

The need to prevent insect or mosquito bites in an outdoor space is well known. There are many prior art devices which attack this problem.

One such prior art device is U.S. Pat. No. 5,700,430, entitled Device for Dispensing a Volatile Substance, owned by a predecessor in interest to this patent application. That handheld device includes a heating plate which vaporizes a volatilizable insecticide impregnated mat which sits on a plate which is heated.

There are many other prior art devices with different approaches attempting to stop and interfere with mosquito and insect bites.

Important areas for insect repellent systems are locations near homes such as patios, backyards and the like. People gather together to socialize, generally within the area defined by the location of the people. Similarly, an individual wants to be outdoors and not be bitten by insects.

This invention is directed to providing individual and a plurality of insect repellent devices easily and conveniently placed and located in backyards and patios to disperse insect repellent. The insect repellent devices are held in a housing attached to a pole which is staked in the ground or held in a moveable pole holder sitting on the ground or patio. An aspect of the present invention is to create a perimeter or an insect free zone in which people can congregate without fear of being bitten.

An object of this invention is to provide a substantially insect free zone in outdoor areas.

Another object of this invention is to provide such an insect free zone which is easy to set up, portable and moveable, enabling insect free zones to be easily created in convenient locations such as patios or backyards.

It is another object of this invention to efficiently operate systems dispersing insect repellent to maximize the efficiency of the insect free zone, substantially eliminating insects and mosquitos from entering the zone.

Yet another object of this invention is to provide such an insect repellent system which is easily maintained, capable of being easily replenished with fuel, and located at convenient heights for people to easily manipulate, use and control.

Still a further object of this invention is to provide such a system in which the device is powered by a portable hydrocarbon, butane or other gas cartridge capable of being easily replaced while the device is in place.

Another object of this invention is to provide such a system in which functional elements other than the insect repellent system, such as lights, can be held in the housing so that other functions can be achieved such as lighting or differing scents.

Other objects and advances in the features will become more apparent from the following description.

SUMMARY OF THE INVENTION

In accordance with the principles of this invention, an insect repellent system powered by a portable hydrocarbon fuel cartridge, preferably a butane cartridge, is held in a housing mounted on a pole which is staked in place. The device could also be attached to a fixed pole having a base to hold the pole.

The invention comprises a plurality of such devices used together to create an area or perimeter within which insects and mosquitos do not seek to penetrate. A single device provides substantial zone protection in which the benefits of the simplicity of location coupled with easy replacement of a cartridge and convenient height design enables the system to be conveniently used in backyards and on patios and the like.

This system also enables other functional elements to be placed within the pole mounted device to provide other functions such as lights or provide infused pads having different scents in conjunction with the perimeter arrangement of the insect repellent devices of this invention.

DETAILED DESCRIPTION OF THE PREFERRED EMBODIMENT

Figure 1:
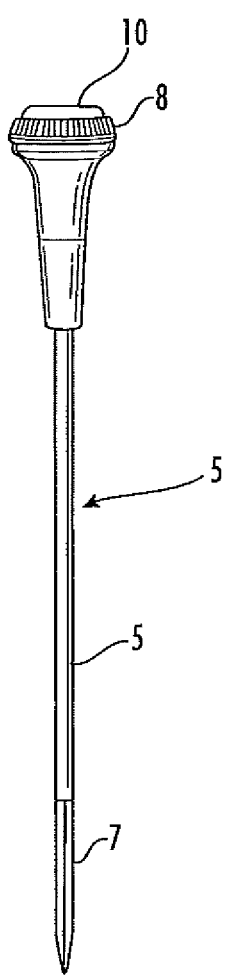
FIG. 1 is a perspective view of a single pole mounted insect repellent device of this invention.
Figure 2:
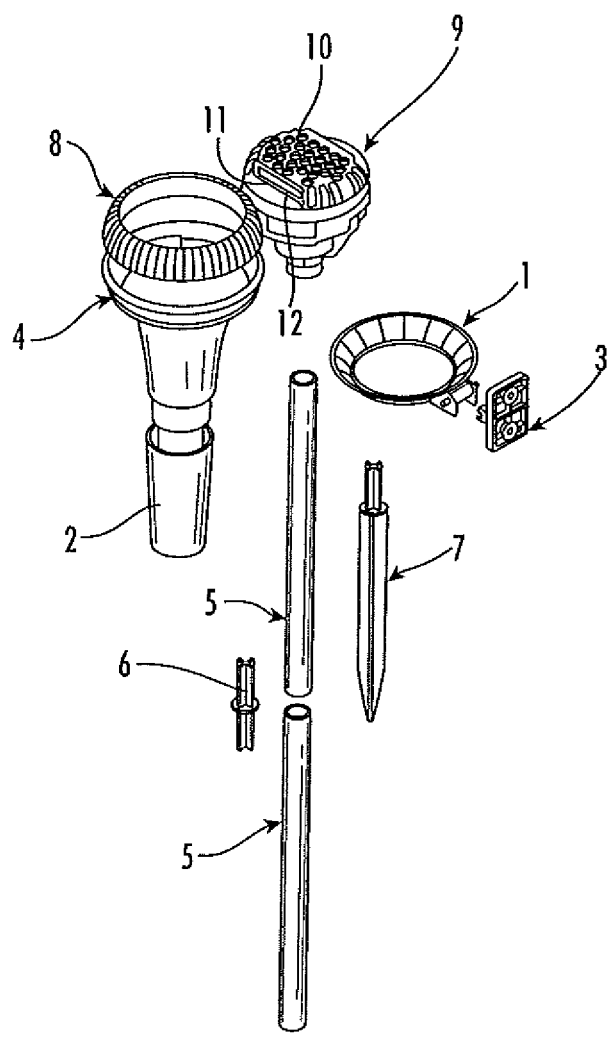
FIG. 2 is an exploded perspective view showing the individual parts of the device of this invention.
Figures 3, 3A:
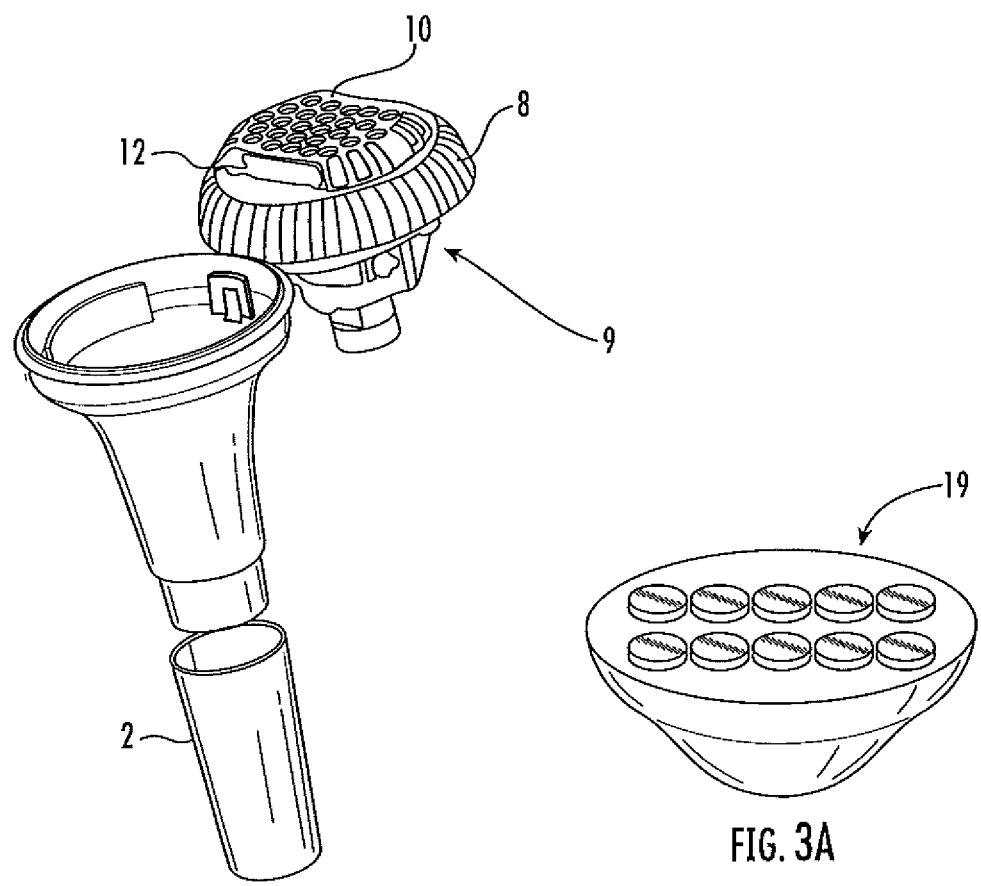
FIG. 3 is an exploded perspective view of the insect repellent device insertable into a housing.
FIG. 3a is a perspective view of a light holder which may sit in bracket 1.

The following lists the reference numerals and related parts of this invention:

Reference numeral 1 is a bracket holding the device;

Reference numeral 2 is a tube through which a butane cartridge may be inserted to power the device;

Reference numeral 3 is a bracket mount allowing the bracket 1 and device to be attached to a fixed or rigid pole;

Reference numeral 4 is generally identified as the housing for the device;

Reference numeral 5 is a tube allowing desired heights to be achieved with the height being adjustable by adding or removing such tubes;

Reference numeral 6 is a connector connecting individual tubes together;

Reference numeral 7 is a pole stake enabling the device to be staked into the ground. The pole can be held in a conventional moveable pole holder rather than being staked in the ground.

Reference numeral 8 is identified as a roof or collar covering a portion of the device and enabling rotation to operate the unit; and Reference numeral 9 is a head assembly, such as a core or central portion of the device having a grill 10 on top and a heating plate 11 as well as a space or slot 12 for a pad 21 to sit on the heating plate as is generally shown in prior U.S. Pat. No. 5,700,430. In the embodiment of the present invention, the plate 11 is round.

Reference numeral 19 is a portable light assembly held in bracket 1 instead of core 9.

Reference numeral 22 is the pole mounted insect repellent device.

Reference numeral 23 is an illustrative perimeter zone created by a plurality of insect repellent devices 22.

In accordance with the principles of this invention and as shown in the Figures, an insect repellent device is provided which is convenient to use in many locations such as backyards, patios and the like. These devices may be made of plastic, are easily transportable and may be carried to picnic or other outdoor locations where the desirability of creating an insect free perimeter zone 23 is apparent. The present device may be staked in the ground when the pole has such a bottom, or the pole may be held in a moveable base.

Figure 6:
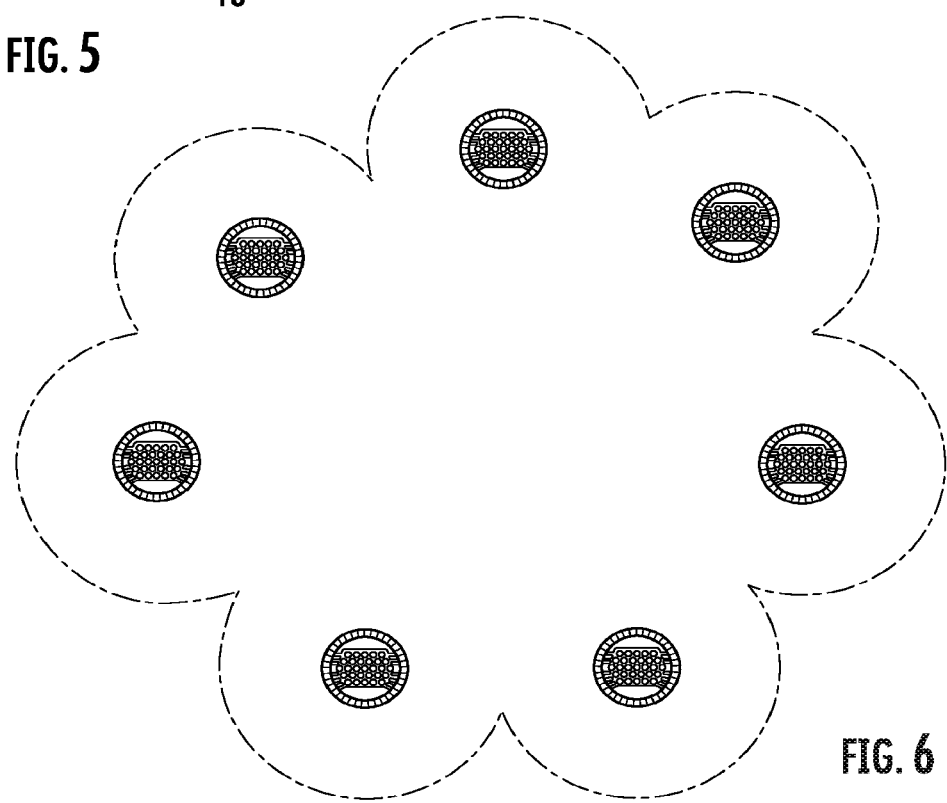
FIG. 6 is a top view of a perimeter zone formed by a plurality of pole mounted insect repellent devices.

This invention contemplates providing a plurality of such pole mounted devices arranged with respect to each other to create an insect free zone. Illustratively, a plurality of devices could form a circular orientation of perhaps up to 15-25 feet in diameter in which an insect free zone is created (See FIG. 6).

Individual pole mounted repellent devices of this invention can create smaller insect free zones employing the improvements described above.

Figure 4:
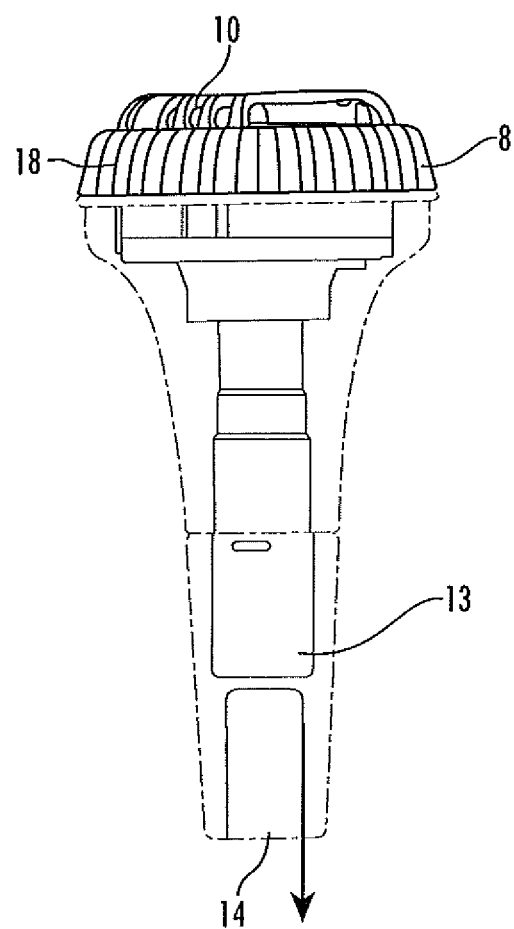
FIG. 4 is a sectional view of the device when assembled.
Figure 5:
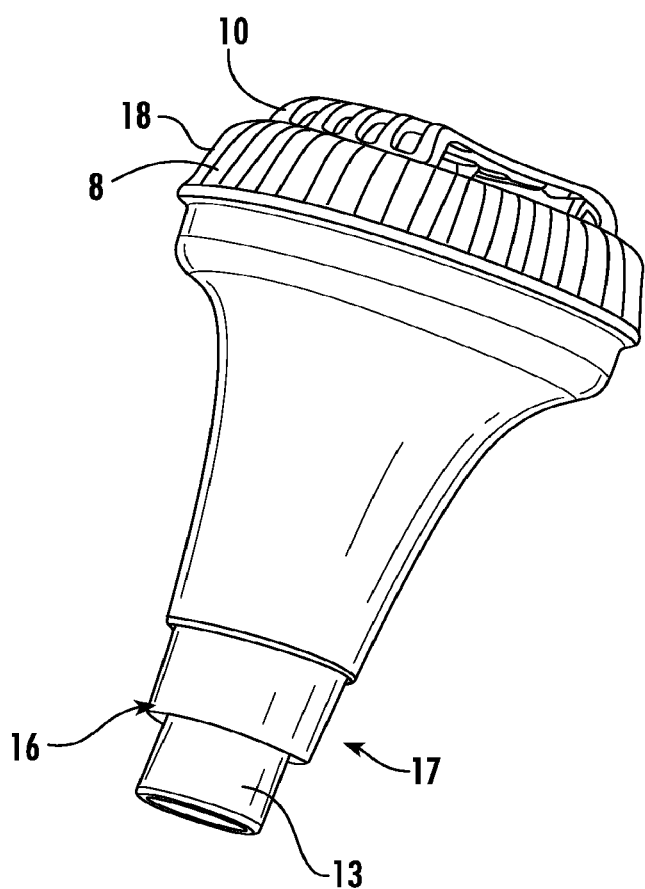
FIG. 5 is a perspective view of the assembled housing device with a slot on the lower portion of the housing.

In accordance with the principles of this invention replacement fuel cartridges 13 (see FIG. 5) may be attached to the gas passage and valve assembly shown in the interior of the device as seen in FIG. 4. This internal assembly to operate the device and heat the plate is generally similar to that provided and described in U.S. Pat. No. 5,700,430.

A feature of this device is that it is used in a substantially vertical orientation, and such orientation provides a most effective and efficient volatilization of the insect repellent impregnated in the mat. Maintaining the insect repellent device in a vertical direction enhances the operation of the present invention.

As shown in FIG. 4, the device both ignites and operates under control of a moveable collar 8 with respect to the housing which both ignites a piezo electric element and controls a flame powered by the fuel cartridge to heat the plate and disperse the insecticide.

The grill 10 on top of the device prevents access to the heated plate.

Housing 4 is shown holding head assembly core 9. Such housing may also hold other head assembly functional elements, such as a portable light assembly 19 or scent carrying pads (not shown). Such pads may be used in conjunction with insect repellent pad 21 or instead of such pad. The light assembly 19 can be used for nighttime. Such other functional elements will be held in place by bracket 1 when assembled.

A slot 16 (See FIG. 5) located at the bottom portion 17 of housing 4 allows a rotational force to be applied to collar 8 without concurrently causing slipping or rotation of the housing during rotation of the collar. Collar 8 has a plurality of parallel gripping surfaces 18 around its perimeter. Both the core 9 and perimeter housing 4 are held in place in the conventional fashion of a rib or the like, and core 9 and housing 4 do not rotate when collar 8 rotates.

It should be understood that the preferred embodiment was described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

The invention claimed is:

1. A method for providing an insect free zone utilizing a plurality of pole mounted insect repellent systems comprising the steps of:
    forming said insect free zone by utilizing said plurality of pole mounted insect repellent systems to create a perimeter for said insect free zone, said perimeter defined by the locations of said insect repellent systems;
    providing a housing supported on a pole of the pole mounted insect repellent system, the housing supporting a head assembly core containing a combustible fuel source and a heating plate;
    providing a collar attached for rotation relative to the head assembly core, the collar configured to ignite and control output of the combustible fuel source; and
    rotating the collar relative to the head assembly to create the insect free zone perimeter.

2. The method for providing an insect free zone according to claim 1, wherein the step of adjusting said perimeter includes the step of rotating the collar in a first direction to create the perimeter by permitting output of the combustible fuel source or rotating the collar in a second direction to prevent the output of the combustible fuel source.

3. The method for providing an insect free zone according to claim 1, wherein the step of providing a housing supported on a pole of the pole mounted insect repellent system, includes the step of replacing the head assembly core with one of a portable light assembly.

4. The method for providing an insect free zone according to claim 1, wherein the step of providing the insect free zone includes providing at least one of said insect repellent systems with a pad impregnated with differing scents.

5. A pole mounted insect repellent system comprising a pole, said pole mounted insect repellent system comprising:
    a housing attached to the top of said pole,
    a head assembly removably held in said housing, the head assembly including a combustible fuel source and a heating plate; and
    a collar rotatably attached to said head assembly, the collar configured to ignite and permit output of the combustible fuel source when rotated in a first direction and prevent the output of the combustible fuel source when rotated in a second direction.

6. The pole mounted insect repellent system according to claim 5, wherein said head assembly includes a piezo electric element that ignites the combustible fuel source upon rotation of the collar in the first direction.

7. The pole mounted insect repellent system according to claim 5, wherein said head assembly comprises a light assembly.

8. The pole mounted insect repellent system according to claim 5, wherein said head assembly comprises sources of different scents adapted to be used with said insect repellent system.

9. The pole mounted insect repellent system according to claim 7, wherein said light assembly is located between said collar and said housing.

10. The pole mounted insect repellent system according to claim 5, wherein said pole is staked in the ground and held vertically.

11. The pole mounted insect repellent system according to claim 5, wherein the head assembly is interchangeable with a portable light assembly, the portable light assembly configured to be held in the housing.

12. A pole mounted insect repellent system comprising:
a housing defining a repeller support cavity and a pole mounting structure;
a head assembly including a grill, a heat plate, a volatilizable insect repellent exposed to the heat plate, a combustible fuel cartridge; and
a regulating collar, the regulating collar configured to control fuel output of the combustible fuel cartridge, the head assembly removably supported by the housing such that the grill and the regulating collar are accessible outside of the repeller support cavity and the combustible fuel cartridge is positioned within the repeller support cavity, the head assembly being fixed for rotation relative to the housing and the regulating collar rotatably supported on the head assembly.

13. The pole mounted insect repellent system according to claim 12, wherein the regulating collar is configured to ignite and permit output of the combustible fuel cartridge when rotated in a first direction and prevent the output of the combustible fuel cartridge when rotated in a second direction.

14. The pole mounted insect repellent system according to claim 13, wherein a piezo electric element ignites the combustible fuel cartridge upon rotation of the collar in the first direction.

* * * * *